Patented Oct. 19, 1948

2,451,897

UNITED STATES PATENT OFFICE 2,451,897

METHOD OF TREATING SHRIMP

Eric R. Woodward, New York, N. Y., assignor to Mathieson Chemical Corporation, a corporation of Virginia No Drawing. Application November 23, 1946, Serial No. 711,826

3 Claims. (Cl. 99—111)

The present invention relates to the treatment of shrimp and provides a method whereby the objectionable medicinal taste sometimes found in shrimp may be effectively inhibited.

This medicinal taste appears to be due to the presence of iodoform in the shrimp formed principally from the iodine present in sea water. This characteristic of shrimp appears to be more prevalent in shrimp caught at certain seasons of the year, depending in large measure upon the waters from which the shrimp are taken. Shrimp having this characteristic medicinal taste are locally called formaldehyde shrimp and are not suitable for eating.

This iodoform taste is at times present in fresh shrimp and sometimes appears to be developed in the shrimp during or following canning of the shrimp.

I have found that this objectionable taste of so-called formaldehyde shrimp may be substantially if not completely avoided by treating the shrimp with chlorine dioxide. The shrimp may with advantage be treated according to the present invention by placing the shrimp, preferably after removing the shell, in an aqueous bath in which chlorine dioxide has been dissolved. An alternative is slowly to bubble dioxide gas through water in which the shrimp to be treated are immersed.

Where the shrimp are to be canned they may with advantage be prepared for canning in the customary manner, placed in the cans and a small amount of chlorine dioxide, either as a gas or in aqueous solution, added to the cans of fresh shrimp immediately before sealing the cans and processing.

The optimum concentration of chlorine dioxide in the water used in treating shrimp not to be canned and the amount of chlorine dioxide to be added in canning will depend primarily upon the strength of the iodoform taste or extent of the tendency toward the development of the iodoform taste in the shrimp. In canning shrimp it has been found that the addition of about 40 P. P. M. of chlorine dioxide based on the weight of the shrimp is generally effective. Where the shrimp are not to be canned they may be treated as above noted with an aqueous solution of chlorine dioxide using about 50 P. P. M. of chlorine dioxide based on the weight of the shrimp. The period of treatment will likewise depend upon the particular shrimp treated, that is the extent of the tendency to develop an iodoform taste, and also upon the concentration of the chlorine dioxide in the water.

I cannot at present prescribe process conditions applicable to all shrimp as the extent of the tendency toward the iodoform taste varies decidedly and is not specifically determinable except by test applied to the particular shrimp. However, optimum conditions of the treatment are readily determinable for any particular shrimp by simple test.

A concentration of chlorine dioxide up to about 100 P. P. M. in the water in which the shrimp are immersed may be used without deleteriously affecting the natural taste or food value of the shrimp. Further no harmful residue is formed in the shrimp by this treatment either where the invention is applied to the treatment of fresh shrimp or applied to the canning of shrimp.

In handling chlorine dioxide due precaution must be taken to avoid concentrations of chlorine dioxide gas at partial pressures in excess of about 30 mm. of mercury. It may be safely handled, dissolved in water or in admixtures with an inert gas, air for instance, at partial pressures not exceeding about 30 mm. of mercury.

I claim:

1. A method of inhibiting the iodoform taste sometimes encountered in shrimp which includes the step of treating shrimp with chlorine dioxide.

2. A method of inhibiting the iodoform taste sometimes encountered in shrimp which includes the step of soaking the shrimp in water in which chlorine dioxide has been dissolved.

3. In the canning of shrimp by the method which includes the placing of a shrimp in a can and thereafter sealing and processing the canned shrimp, a method of inhibiting the iodoform taste sometimes encountered in the canned shrimp which includes the step of adding chlorine dioxide to the cans of fresh shrimp immediately before sealing.

ERIC R. WOODWARD.

REFERENCES CITED

The following references are of record in the file of this patent:

UNITED STATES PATENTS

| Number | Name | Date |
|---|---|---|
| 2,294,428 | Stockhamer | Sept. 1, 1942 |
| 2,349,836 | Stuart | May 30, 1944 |

FOREIGN PATENTS

| Number | Country | Date |
|---|---|---|
| 173,285 | Great Britain | Dec. 20, 1921 |
| 116,149 | Australia | Nov. 26, 1942 |